(12) United States Patent
Mueller et al.

(10) Patent No.: US 8,026,485 B2
(45) Date of Patent: Sep. 27, 2011

(54) CHITIN-BASED CANTILEVER BIMORPHS AND READOUT DEVICES

(75) Inventors: Michael T. Mueller, Pflugerville, TX (US); Albert P. Pisano, Danville, CA (US); Robert Azevedo, Albany, CA (US); David C. Walther, Oakland, CA (US); David R. Myers, Albany, CA (US); Matthew Wasilik, Moraga, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 12/725,115

(22) Filed: Mar. 16, 2010

(65) Prior Publication Data

US 2010/0243904 A1    Sep. 30, 2010

Related U.S. Application Data

(63) Continuation of application No. PCT/US2008/076705, filed on Sep. 17, 2008.

(60) Provisional application No. 60/972,849, filed on Sep. 17, 2007.

(51) Int. Cl.
*G01J 5/20* (2006.01)
(52) U.S. Cl. ............... 250/338.1; 250/336.1; 250/338.4
(58) Field of Classification Search ............. 250/336.1, 250/338.1
See application file for complete search history.

(56) References Cited

U.S. PATENT DOCUMENTS 6,469,301 B1* 10/2002 Suzuki et al. ............. 250/338.1
2007/0108384 A1* 5/2007 Mueller et al. ............ 250/338.1

OTHER PUBLICATIONS

Mueller, Michael T. "Biomemetic, Polymer-Based Microcantilever Infrared Sensors". Dissertation: University of California, Berkeley, 2007.*
Pisano, Albert P. "Development of an Uncooled Photomechanic Infrared Sensor Based on the IR Organ of the Pyrophilous Jewel Beetle Melanophila Acuminata". Fianl Report for AFOSR/NL: Jan. 2007.*
LeMieux, M.C. et al.—"Polymeric Nanolayers as Actuators for Ultrasensitive Thermal Bimorphs"—Nano Letters, vol. 6, No. 4, 2006, pp. 730-734.
Li, B.—"Design and simulation of an uncooled double-cantilever microbolometer with the potential for ~mK NETD"—Sensors and Actuators A, vol. 112, 2004, pp. 351-359.
Liddiard, K.C.—"Application of Interferometric Enhancement to Self-Absorbing Think Film Thermal IR Detectors"—Infrared Phys., vol. 34, No. 4, 1993, pp. 379-387.
Lim, S. et al.—"Design and Fabrication of a Novel Bimorph Micro-Opto-Mechanical Sensor"—Journ. of Microelectromechanical Systems, vol. 14, No. 4, 2005, pp. 683-690.

(Continued)

*Primary Examiner* — David Porta
*Assistant Examiner* — Casey Bryant
(74) *Attorney, Agent, or Firm* — John P. O'Banion

(57) ABSTRACT

An infrared sensor with at least one cantilever beam functionalized with chitin, chitosan or their derivatives that can be tailored to be sensitive to certain IR bands for detection and does not require cooling is described. The functional layers expand differently than the structural layer of the cantilever beam causing the beam to bend in response to exposure to infrared radiation. The sensor can be adapted to optical, piezoresistive, capacitive and piezoelectric methods of detect beam deflection. Sensitivity can be increased with a reflective layer to increase the absorption of infrared radiation by the functional layer.

20 Claims, 6 Drawing Sheets

OTHER PUBLICATIONS

Kumar, M.—"A review of chitin and chitosan applications"—Reactive & Functional Polymers, vol. 46, 2000, pp. 1-27.
Kurita, K.—"Chitin and Chitosan: Functional Biopolymers from Marine Crustaceans"—Marine Biotechnology, vol. 8, 2006, pp. 203-226.
Hammer, D.X. et al.—"Investigation of the transduction mechanism of infrared detection in Melanophila acuminata: photo-thermal-mechanical hypothesis"—Comparative Biochemistry and Physiology Part A, vol. 132, 2002, pp. 381-392.
Hammer, D.X. et al.—"Infrared spectral sensitivity of Melanophila acuminata"—Journal of Insect Physiology, vol. 47, 2001, pp. 1441-1450.
Hanson, C.M.—"Barriers to background-limited performance for uncooled IR sensors"—Proc. of SPIE, vol. 5406, 2004, pp. 454-464.
He, J. et al.—"A thermal sensor and switch based on a plasma polymer/ZnO suspended nanobelt bimorph structure"—Nanotechnology, vol. 20, 2009, 5 pages.
Hsu, C. et al.—"Instability in micromachined curved thermal bimorph structures"—Jour. Micromech. Microeng., vol. 13, 2003, pp. 95-962.
Huang, S. et al.—"Elimination of stress-induced curvature in microcantilever infrared focal plane arrays"—Sensors and Actuators A, vol. 130-131, 2006, pp. 331-339.
Huang, S. et al.—"Development of Double-Cantilever Infrared Focal Plane Arrays: Fabrication and Post-Process Curvature Modification"—Proc. Mater. Res. Soc. Symp., vol. 952, 2007, 7 pages.
Huang, S. et al.—"Development of double-cantilever infrared detectors: Fabrication, curvature control and demonstration of thermal detection" Sensors and Actuators A, vol. 145-146, 2008, pp. 231-240.
Hunter, S.R. et al.—"High Sensitivity Uncooled Microcantilever Infrared Imaging Arrays"—SPIE Defense and Security Symp., Apr. 19, 2006, 12 pages.
Hunter, S.R. et al—"High Sensitivity 25um and 50um Pitch Microcantilever IR Imaging Arrays"—SPIE Defense and Security Symp., Apr. 11, 2007, 13 pages.
Jensen, A.S.—"Limitations to Room Temperature IR Imaging Systems"—SPIE vol. 2020 Infrared Technology XIX, 1993, pp. 340-350.
Jones, C.D.W. et al.—"Opportunities in Uncooled Infrared Imaging: A MEMS Perspective"—Bell Labs Tech. Journal, vol. 14, No. 3, 2209, pp. 85-98.
Jones, C.D.W. et al.—"MEMS thermal imager with optical readout"—Sensors and Actuators A, vol. 155, 2009, pp. 47-57.
Karp, J.M. et al.—"A photolithographic method to create cellular micropatterns"—Biomaterials 27, 2006, pp. 4755-4765.
Kruse, P.W.—"A comparison of the limits to the performance of thermal and photon detector imaging arrays"—Infrared Phys. Technol. 36, 1995, pp. 869-882.
Oden, P.I. et al—"Uncooled thermal imaging using a piezoresistive microcantilever"—Appl. Phys. Lett., vol. 69, No. 21, Nov. 18, 1996, pp. 3277-3279.
Park, I. et al.—"Low temperature, low pressure nanoimprinting of chitosan as a biomaterial for bionanotechnology applications"—App. Phys. Lett., vol. 90, 2007, pp. 093902-1-093902-3.
Peng, W. et al.—"Optimization of Thermally Actuated Bimorph Cantilevers for Maximum Deflection"—Nanotech 2003, vol. 12, 4 pages.
Piotrowski, J.—"Breakthrough in infrared technology—the micromachined thermal detector arrays"—Opto-electronics Review 1, 1995, pp. 3-8.
Piotrowski, J. et al.—"Ultimate performance of infrared photodetectors and figure of merit of detector metal"—Infrared Physics & Technology 38, 1997, pp. 63-68.
Poladian, V.M. et al.—"Modelling of Residual Stress in a Multilayer Micromachined Cantilever"—Proc. of the International Semiconductor Conf., vol. 2, 2000, pp. 499-502.
Prokoski, F.—"History, Current Status, and Future of Infrared Identification"—IEEE Workshop on Computer Vision Beyond the Visible Spectrum: Methods and Applications, Hilton Head, SC, Jun. 13-15, 2000, 10 pages.

Murphy, D. et al.—"640×512 17 um Mircrobolometer FPA and Sensor Development"—Proc. of SPIE, vol. 6542, 2007, pp. 65421Z-1-65421Z-10.
Rogalski, A.—"Infrared detectors: status and trends"—Progress in Quantum Electronics 27, 2003, pp. 51-210.
Salerno, J.P.—"High Frame Rate Imaging Using Uncooled Optical Readout Photomechanical IR Sensor"—Proc. of SPIE, vol. 6542, pp. 65421D-1-65421D-9.
Schmitz, H. et al.—"Responses of the infrared sensilla of Melanophila acuminata (Coleoptera: Buprestidae) to monocrhromatic infrared stimulation"—Jour. Comp. Physiol. A, vol. 186, 2000, pp. 543-549.
Bleckmann, H. et al.—"Nature as a model for technical sensors"—Jour. Comp. Physiol A, vol. 190, 204, pp. 971-981.
Schmitz, H. et al.—"The photomechanic infrared receptor for the detection of the forest fires in the beetle Melanphila acuminata (Coleoptera: Buprestidae)"—Journ. Comp. Physiol. A, vol. 182, 1998, pp. 647-657.
Niklaus, F. et al.—"MEMS-Based Uncooled Infrared Bolometer Arrays—A Review"—Proc. of MEMS/MOEMS Technologies and Applications III, vol. 6836, Jan. 4, 2008, pp. 68360D-1-68360D-15.
Norton, P. et al.—"Third-generation infrared imagers"—Proc. of SPIE Infrared Tech. and Apps. XXVI, vo.. 4130, 2000, pp. 226-235.
Norton, P. et al.—"Micro-optomechanical infrared receiver with optical readout—Mirror"—Proc. of SPIE Infrared Detectors and Focal Plane ArraysVI, vol. 4028, 2000, pp. 72-78.
Torun, H. et al.—"Uncooled thermo-mechanical detector array with optical readout"—Opto-Electronics Review, vol. 14, No. 1, 2006, pp. 54-58.
Tsow, F. et al.—"Microfabricated tuning fork temperature and infrared sensor"—Applied Physics Letters 90, 2007, pp. 174102-1-174102-3.
Varghese, M. et al.—"Resistive Damping of Pulse-Sensed Capacitive Position Sensors"—Transducers 97, Proc. of the Intern. Conf. on Solid-State Sensors and Actuators, Jun. 16-19, 1997, pp. 1121-1124.
Vondran, T. et al.—"The infrared receptor of Melanophila acuminata De Geer (Coleoptera Buprestidae): ultrastructural study of a unique insect thermoreceptor and its possible descent from a hair mechanoreceptor" Tissue & Cell vol. 27, 1995, pp. 645-658.
Wachter, E.A. et al.—"Micromechanical sensors for chemical and physical measurements"—Rev. Sci. Instrum., vol. 66, No. 6, Jun. 1995, pp. 3662-3667.
Wachter, E.A. et al.—"Remote optical detection using microcantilevers"—Rev. Sci. Instrum., vol. 67, No. 10, Oct. 1996, pp. 3434-3439.
Wang, H. et al.—"IR microbolometer with self-supporting structure operating at room temperature"—Infrared Physics & Technology 45, 2004, pp. 53-57.
Wang, Z. et al.—"Design and optimization of laminated piezoresistive microcantilever sensors" Sensors and Actuators A, vol. 120, 2005, pp. 325-336.
Wang, W. et al.—"Simulation and Experimental Studies of an Uncooled MEMS Capacitive Infrared Detector for Thermal Imaging"—Journ. of Physics: Conference Series 34, 2006, pp. 350-355.
Singamaneni, S. et al.—"Polymer-Silicon Flexible Structures for Fast Chemical Vapor Detection"—Adv. Matter, vol. 19, 2007, pp. 4248-4255.
Singamaneni, S. et al.—"Bimaterial Microcantilevers as a Hybrid Sensing Platform"—Ad. Matter, vol. 20, 2008, pp. 653-680.
Snow, D. et al.—"Static deflection measurements of cantilever arrays reveal polymer film expansion and contraction"—Journ. of Colloid and Interface Science, vol. 316, 2007, pp. 687-693.
Scribner, D.A. et al.—"Infrared Focal Plane Array Technology"—Proc. of the IEEE, vol. 79, No. 1, Jan. 1991, pp. 66-85.
Cheng, J. et al.—"Lithographic Patterning of Immobilized Enzymes in Chitosan Thin Films for Multi-Layer, Chemical/Biological Sensors"—7th IEEE Conference on Nanotechnology, Aug. 2-5, 2007, pp. 334-337.
Amantea, R. et al.—"An Uncooled IR Imager with 5 mK NEDT"—SPIE vol. 3061, 1997, pp. 210-222.
Datskos, P.G. et al.—"Remote infrared radiation detection using piezoresistive mircocantilevers"—Appl. Phys. Lett., vol. 69, No. 20, Nov. 1996, pp. 2986-2988.

Grbovic, D. et al.—"Uncooled infrared imaging using bimaterial microcantilever arrays"—Appl. Phys. Lett., vol. 89, No. 7, 2006, pp. 073118-1-073118-3.

Barnes, J.R. et al.—"Photothermal spectroscopy with femtojoule sensitivity using a micromechanical device"—Nature, vol. 372, Nov. 3, 1994, pp. 79-81.

Belenky, A. et al.—"Method for expanding the dynamic range of the readout integration circuits for uncooled microbolometer sensors"—Opt. Eng., vol. 43, No. 6, Jun. 2004, pp. 1274-1275.

Calleja, M. et al.—"Polymeric Cantilever Arrays for Biosensing Applications"—Sensor Letters, vol. 1, No. 1, 2003, pp. 1-5.

Campbell, A.L. et al.—"Biological infrared imaging and sensing"—Micron, vol. 33, 2002, pp. 211-225.

Chang, S. et al.—"Demonstration for integrating capacitive pressure sensors with read-out circuitry on stainless steel substrate"—Sensors and Actuators A, vol. 116, 2004, pp. 195-204.

Chatzandroulis, S. et al.—"Capacitive-type chemical sensors using thin silicon/polymer bimorph membranes"—Sensors and Actuators B, vol. 103, 2004, pp. 392-396.

Cheng, J. C. et al.—"Photolithographic Process for Integration of the Biopolymer Chitosan Into Micro/Nanostructures"—Journal of Microelectromechanical Systems, vol. 17, No. 2, Apr. 2008, pp. 402-409.

Lin, Y. et al.—"Trilayered Ceramic-Metal-Polymer Microcantilevers with Dramatically Enhanced Thermal Sensitivity"—Advanced Materials, vol. 18, 2006, pp. 1157-1161.

Wei, L.C. et al.—"Analytical Modeling for Determination of Pull-In Voltage for an Electrostatic Actuated MEMS Cantilever Beam"—IEEE Int. Conf. on Semiconductor Electronics, Malaysia, Dec. 19-21, 2002, pp. 233-238.

Wiecek, B.—"Cooling and shielding systems for infrared detectors—requirements and limits"—Proc. of the 2005 IEEE Engr. In Med. and Biology 27th Ann. Conf., Shanghai, China, Sep. 1-4, 2005, pp. 619-622.

Wu, L. et al.—"Voltage-Dependent Assembly of the Polysaccharide Chitosan onto an Electrode Surface"—Langmuir, vol. 18, 2002, pp. 8620-8625.

Yi, Y. et al.—"An Uncooled Microcantilever IR Detector Based on Bulk Silicon Technique"—Solid-State Sensors, Actuators and Microsystems Conf., Transducers, Denver, CO, Jun. 21-25, 2009, pp. 485-488.

Yusof, N. et al.—"Flexible chitin films: structural studies"—Carbohydrate Research, vol. 339, 2004, pp. 2701-2711.

Zhang, Y. et al.—"Deformation of Blanketed and Patterned Bilayer Thin-Film Microstructures During Post-Release and Cyclic Thermal Loading"—Jour. of Microelectromechanical Systems, vol. 12, No. 6, Dec. 2003, pp. 788-796.

Zhao, Y. et al.—"Optomechanical Uncooled Infrared Imaging System: Design, Microfabrication, Performance"—Jour. of Microelectromechanical Systems, vol. 11, No. 2, Apr. 2002, pp. 136-146.

Choi, J. et al.—"Design and control of a thermal stabilizing system for a MEMS optomechanical uncooled infrared imaging camera"—Sensors and Actuators A, vol. 104, 2003, pp. 132-142.

Chu, W. et al.—"Analysis of tip deflection and force of a bimetallic cantilever microactuator" Jour. Micromech. Microeng., vol. 3, 1993, pp. 4-7.

Corbeil, J.L. et al.—""Self-leveling" uncooled microcantilever thermal detector"—App. Phys. Letters, vol. 81, No. 7, Aug. 12, 2002, pp. 1306-1308.

Datskos, P.G. et al.—"Performance of uncooled microcantilever thermal detectors"—Review of Scientific Intsruments, vol. 75, No. 4, Apr. 2004, pp. 1134-1148.

Djuric, Z. et al.—"A new approach to IR bimaterial detectors theory"—Infrared Physics & Technology, vol. 50, 2007, pp. 51-57.

East, G.C. et al.—"Wet Spinning of Chitosan and the Acetylation of Chitosan Fibers"—Journal of Applied Polymer Science, vol. 50, No. 10, 1993, pp. 1773-1779.

Evans, W.G.—"Perception of Infrared Radiation from Forest Fires by Melanophila Acuminata de Geer"—Ecology, vol. 47, No. 6, Nov. 1966, pp. 1061-1065.

Evans, W.G.—"Infrared Radiation Sensors of Melanophila acuminata (Coleoptera: Buprestidae): A Thermopneumatic Model"—Morphology, Histology, and Fine Structure, Annals of the Entomological Society of America, vol. 95, No. 5, pp. 738-746.

Evans, W.G.—"Infra-red Receptors in Melanophila acuminata DeGeer"—Nature, No. 4928, Apr. 11, 1964, pp. 211.

Evans, W.G.—"Morphology of the Infrared Sense Organs of Melanophila acuminata(Buprestidae: Coleoptera)"—Annals of the Entomological Society of America, vol. 59, No. 5, Sep. 1966, pp. 873-877.

Fang, W. et al.—"Comments on measuring thin-film stresses using bi-layer micromachined beams"—Jour. Micromech. Microeng, vol. 5, 1995, pp. 276-281.

Hazel, J. et al.—"Ultramicrostructure and Microthermomechanics of Biological IR Detectors: Materials Properties from a Biomimetic Perspective"—Biomacromolecules, vol. 2, 2001, pp. 304-312.

Gorbunov, V. et al.—"Biological Thermal Detection: Micromechanical and Microthermal Properties of Biological Infrared Receptors"—Biomacromolecules, vol. 3, 2002, pp. 106-115.

Gritz, M.A. et al.—"Wavelength tuning of an antenna-coupled infrared microbolometer"—Jour. Vac. Sci. Technol. B, vol. 22, No. 6, Nov./Dec. 2004, pp. 3133-3136.

Guo, Z. et al.—"Performance analysis of microcantilever arrays for optical readout uncooled infrared imaging"—Sensors and Actuators A, vol. 137, 2007, pp. 13-19.

Lin, I. et al.—"The deformation of microcantilever-based infrared detectors during thermal cycling"—Jour. of Micromech. Mircroeng., vol. 18, 2008, pp. 1-9.

Liu, C.—"Recent Developments in Polymer MEMS"—Advanced Materials, vol. 19, 2007, pp. 3783-3790.

Liu, W. et al.—"Surface Micromachining of Uncooled Infrared Imaging Array Using Anisotropic Conductive Film"—Proc. SPIE, vol. 4592, No. 159, 2001.

Mahmood, A. et al.—"A Device-Level Vacuum-Packaging Scheme for Microbolometers on Rigid and Flexible Substrates"—IEEE Sensors Journal, vol. 7, No. 7, Jul. 2007, pp. 1012-1019.

Manalis, S.R. et al.—"Two-dimensional micromechanical bimorph arrays for detection of thermal radiation"—Appl. Phys. Letters, vol. 70, No. 24, Jun. 16, 1997, pp. 3311-3313.

Perazzo, T.—"Infrared vision using uncooled micro-optomechanical camera"—Applied Physics Letters, vol. 74, No. 23, Jun. 7, 1999, pp. 3567-3569.

Matovic, J. et al.—"Bimaterial actuators and sensor with built-in compensation of the ambient temperature interference"—ISAS, Technical University, A1040, Vienna, Austria.

Miao, Z. et al.—"Uncooled IR Imaging Using Optomechanical Detectors"—Utramicroscopy, vol. 107, 2007, pp. 910-616.

Murray, C.A. et al.—"Effect of Changes in Relative Humidity and Temperature on Ultrathin Chitosan Films"—Biomacromolecules, vol. 7, No. 12, 2006, pp. 3460-3465.

Kwon, I.W. et al.—"Design and fabrication of a capacitive infrared detector with a floating electrode and thermally isolatable bimorph legs"—Sensors and Actuators A, vol. 147, 2008, pp. 391-400.

Kwon, I.W. et al.—"A high fill-factor uncooled infrared detector with low noise characteristic"—Proc. of SPIE, vol. 6940, pp. 694014-1-694014-10.

Lai, J. et al.—"Optimization and performance of high-resolution micro-optomechanical thermal sensors"—Sensors and Actuators A, vol. 58, 1997, pp. 113-119.

Lavrik, N.V. et al.—"Cantilever transducers as a platform for chemical and biological sensors"—Rev. of Scientific Instruments, vol. 75, No. 7, Jul. 2004, pp. 2229-2253.

Kang, S.G. et al.—"CMOS readout circuit allowing microbolometer arrays to operate without temperature stabilisation"—Electronics Letters, vol. 40, No. 23, Nov. 11, 2004.

Lee, S.—"Assymmetric Dielectric Trilayer Cantilever Probe for Calorimetric High-Frequency Field Imaging"—Jour. of Mircoelectromechanical Systems, vol. 16, No. 1, Feb. 1007, pp. 78-86.

Senesac, L.R. et al.—"IR imaging using uncooled microcantilever detectors"—Ultramicroscopy 97, 2003, pp. 451-458.

Tezcan, D.S. et al.—"A Low-Cost Uncooled Infrared Microbolometer Detector in Standard CMOS Technology"—IEEE Transactions on Electron Devices, vol. 50, No. 2, Feb. 2003, pp. 494-502.

* cited by examiner

CHITIN-BASED CANTILEVER BIMORPHS AND READOUT DEVICES

CROSS-REFERENCE TO RELATED APPLICATIONS

This application claims priority from, and is a 35 U.S.C. §111(a) continuation of, PCT international application serial number PCT/US2008/076705, filed on Sep. 17, 2008, incorporated herein by reference in its entirety, which claims priority from U.S. provisional application Ser. No. 60/972,849 filed on Sep. 17, 2007 incorporated herein by reference.

This application is also related to PCT International Publication No. WO 2009/039193 published on Mar. 26, 2009, incorporated herein by reference in its entirety.

STATEMENT REGARDING FEDERALLY SPONSORED RESEARCH OR DEVELOPMENT

This invention was made with Government support under Grant No. FA9550-1-0422, awarded by AFOSR. The Government has certain rights in this invention.

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND OF THE INVENTION

1. Field of the Invention

This invention pertains generally to electromechanical and high-throughput sensors and more particularly to chitin or chitosan functionalized cantilever-based sensors for infrared detection, imaging and low cost ambient temperature sensor arrays.

2. Description of Related Art

For many years, cantilever structures have been used in microelectromechanical systems (MEMS) as simple sensor elements for transducing environmental stimuli. MEMS cantilevers are typically fabricated from silicon, silicon nitride or polymer materials and can be produced on very small scales through conventional etching techniques.

MEMS cantilevers have been used for biodetection devices, where an analyte binds to an agent on the cantilever surface and the mass of the combination causes the cantilever beam to deflect. These structures have also found application in optical, infrared and thermal detection, where incident energy is absorbed and through a mismatch in thermal properties causes the beam of the cantilever to deflect. One of the primary challenges in using cantilevers for sensing is the need to maximize the sensitivity of the device. Sensitivity is dependent on the geometry of the cantilever beam, the choice of materials, and the quality of the energy coupling.

The method of readout for cantilever-based sensors is also a significant challenge in the development of integrated sensors, imaging arrays and high-throughput systems. Since each element needs to be addressable, the readout generally requires either an optical setup or a custom circuit to be attached to each cantilever. The optical approach generally makes use of large, expensive, and mostly detached (or remote) equipment, to input and measure the amount of light and the specific wavelength(s) that are returned. For example, in atomic force microscopy, laser light is reflected off of the cantilever holding the probe tip, and its reflected position is used to determine the amount of deflection in the cantilever beam.

The circuit approach is normally used to perform piezoresistive or capacitive measurements, and must be integrated with each cantilever device, and may make use of multiplexers to share a readout circuit across multiple devices. MEMS strain gauges, for example, typically rely on the material property of piezoresistivity in order to transduce a strain in the cantilever into a change in resistance. Subsequent electrical circuitry, such as a Wheatstone bridge, may be used to convert the resistance change into a voltage. The challenge with the circuit approach is integration with the MEMS fabrication process and interfacing into an array. In many applications, an array of cantilever elements allows for high-throughput or 2D (focal plane array) imaging.

Infrared sensors have many medical, military, industrial and commercial applications. These IR sensors generally fall within two categories—photonic and thermal. Photonic IR sensors have very narrow bands and require cryocooling for operation that results in high power consumption and very large bulk. Thermal detectors form a class of infrared detectors, including pyroelectrics, bolometers, thermistors, thermopiles and Golay cells, and are generally uncooled. However, both microbolometers and pyroelectrics are electroresistive devices and are therefore still quite sensitive to thermal noise resulting in lower sensitivities and resolutions compared to cryocooled photonic IR sensors. Low temperature requirements often make many existing infrared detector designs unsuitable for ambient temperature applications.

Accordingly, there is a need for an inexpensive apparatus and system that is responsive to infrared radiation at various wavelengths at ambient temperatures and can be adapted to many different sensor needs. The present invention satisfies this need as well as others and is a general improvement over the art.

BRIEF SUMMARY OF THE INVENTION

The present invention provides a biopolymer-based cantilever bimorph for infrared radiation sensing and imaging. Chitin and chitosan, and their derivatives, have been shown to have infrared absorption spectra that make them useful as sensory materials. Chitosan is the deacetylated form of chitin, which is a common nitrogen bearing polysaccharide, and is second only to cellulose as the most abundant polysaccharide formed in nature. Chitin is a polymer of N-acetyl glucosamine (GlcNAc). It is commonly found in the exoskeletons of crustaceans and insects, in the form of threadlike polymer chains of chitin. The spectrum of chitin shows infrared absorption at the 3, 6, and 9 μm bands, corresponding to the presence of carbon-hydrogen single bonds (C—H), carbon oxygen double bonds (C=O), and carbon-oxygen single bonds (C—O), respectively. Additional absorption at 3 μm is due to nitrogen-hydrogen (N—H) single bonds and oxygenhydrogen single bonds (O—H). Chitin is highly acetylated, with the percent acetylation varying depending on the source of the chitin.

Infrared absorption in these polymers occurs when the frequency of the incident infrared energy matches the vibrational resonance of the bond, and a change in dipole moment occurs during the vibration. The absorbed infrared radiation causes either stretching or bending of the bond. To maximize the photomechanical response, the stretching of the bond should translate either throughout the length of a polymer, or between parallel chains. The infrared absorption spectrum of chitosan with absorption peaks in the 3 µm, 6 µm, and 9 µm bands are similar to the infrared absorption spectrum of other polymers such as Polymethylmethacrylate (PMMA) with absorption peaks in the 3, 6, 9 and 15 µm bands and the absorption spectrum of photoresist with peaks in the 3 µm and 6-9 µm bands. These materials can be used alone or in combination to provide narrow band sensitivity to sensor devices.

According to one aspect of the invention, a functionalized cantilever bimorph using chitin or chitosan and derivatives is provided. The basic structure of a cantilever according to the present invention can be illustrated with a beam that has a support layer of a material with a low coefficient of expansion such as polysilicon that is joined to a functionalized layer that is responsive to infrared radiation. Although a linear rectangular beam is used as an illustration, it will be understood that the invention can be used with double clamped beams and beams of any shape or size. The functionalized cantilevers can also be adapted for use with both the static or dynamic forms of detection of cantilever deformation and can be combined to form arrays. Static forms of detection monitor any deflection of the beam continuously that may be produced by exposure while changes in the resonant frequency of the beam are measured in dynamic forms of detection of beam deflection.

In other embodiments, chitin or chitosan is used as an infrared absorber. In various embodiments, an Au, Al or metal layer coats the top side of the device and the device is back-illuminated. In another embodiment, an Au, Al or metal layer coats the bottom side of the chitin layer and the device is front-illuminated. In various embodiments, the device is used for infrared detection, the detection of protein binding, or the detection of DNA binding, biosensing, or thermal detection with a spectral sensitivity.

Another aspect of the invention is a bimorph comprising a structural layer and an infrared absorbing layer that includes a polymer such as photoresist, PMMA, or similar IR absorbing polymer. In other embodiments, the bimorph is a cantilever with polymer as one side and is used for infrared sensing having an optical readout or infrared sensing having a capacitive readout. In various embodiments, the structural layer is polysilicon or silicon dioxide.

According to another aspect of the invention, a cantilever is provided with a capacitive readout for cantilever sense elements where a capacitor is formed from a doped region of the substrate and a conducting layer in the cantilever beam. The capacitance changes with the deflection of the beam in the vertical direction as the distance between the cantilever and substrate varies with the cantilever's deflection. In one embodiment, the conducting layer is selected from the group consisting of aluminum, Au, and doped polysilicon and the substrate is Si. In another embodiment, an absorbing layer is used to sense infrared radiation. The absorbing layer is selected from the group consisting of chitin, chitosan, polymers, and materials with an infrared spectral sensitivity.

According to another aspect of the invention, a cantilever is provided with a capacitive readout with cantilever sense elements where a capacitor is formed between conducting layers in two separate cantilever beams. The capacitance changes with deflection of the beams in the vertical direction as the area of overlap between the two conducting plates varies with the sense cantilever's deflection.

In one embodiment, one cantilever beam is used for sensing and the other beam is used as a reference. In another embodiment, both cantilevers are used for sensing.

In various embodiments, the conducting layer of the beam is selected from the group consisting of aluminum, Au, doped polysilicon, metals, and doped semiconductor materials.

In various embodiments, the readout is a component of an infrared thermal detector where the absorbing layer is selected from the group consisting of chitin, chitosan, polymers, and materials with an infrared spectral sensitivity.

In one embodiment, the readout exhibits a noise cancellation effect whereby the sense and reference cantilevers are exposed to nearly the same background fluctuations, etc.

In one embodiment, a plurality of readouts is configured in an array where the sense and reference cantilevers have the same lengths. In another embodiment, a plurality of such readouts is configured in an array where the sense and reference cantilevers have different lengths but occupy the same total length on a wafer.

In one embodiment, the cantilever capacitors are connected in parallel, so as to increase their capacitance.

In various embodiments, the readout is used to readout the deflection of a cantilever sensing ionizing radiation, used to readout the deflection of a cantilever sensing the presence of a biowarfare agent, or used to readout the deflection of a cantilever sensing the presence of a chemical weapon.

According to another aspect of the invention, a comb capacitor readout for cantilever sense elements is provided where a capacitor is formed by arranging two reference cantilevers on the sides of a sense cantilever. When the sense cantilever deflects in the vertical direction, the amount of overlap with the reference cantilevers changes and the measured capacitance changes.

BRIEF DESCRIPTION OF THE SEVERAL VIEWS OF THE DRAWINGS

The invention will be more fully understood by reference to the following drawings which are for illustrative purposes only.

DETAILED DESCRIPTION OF THE INVENTION

Figure 1:
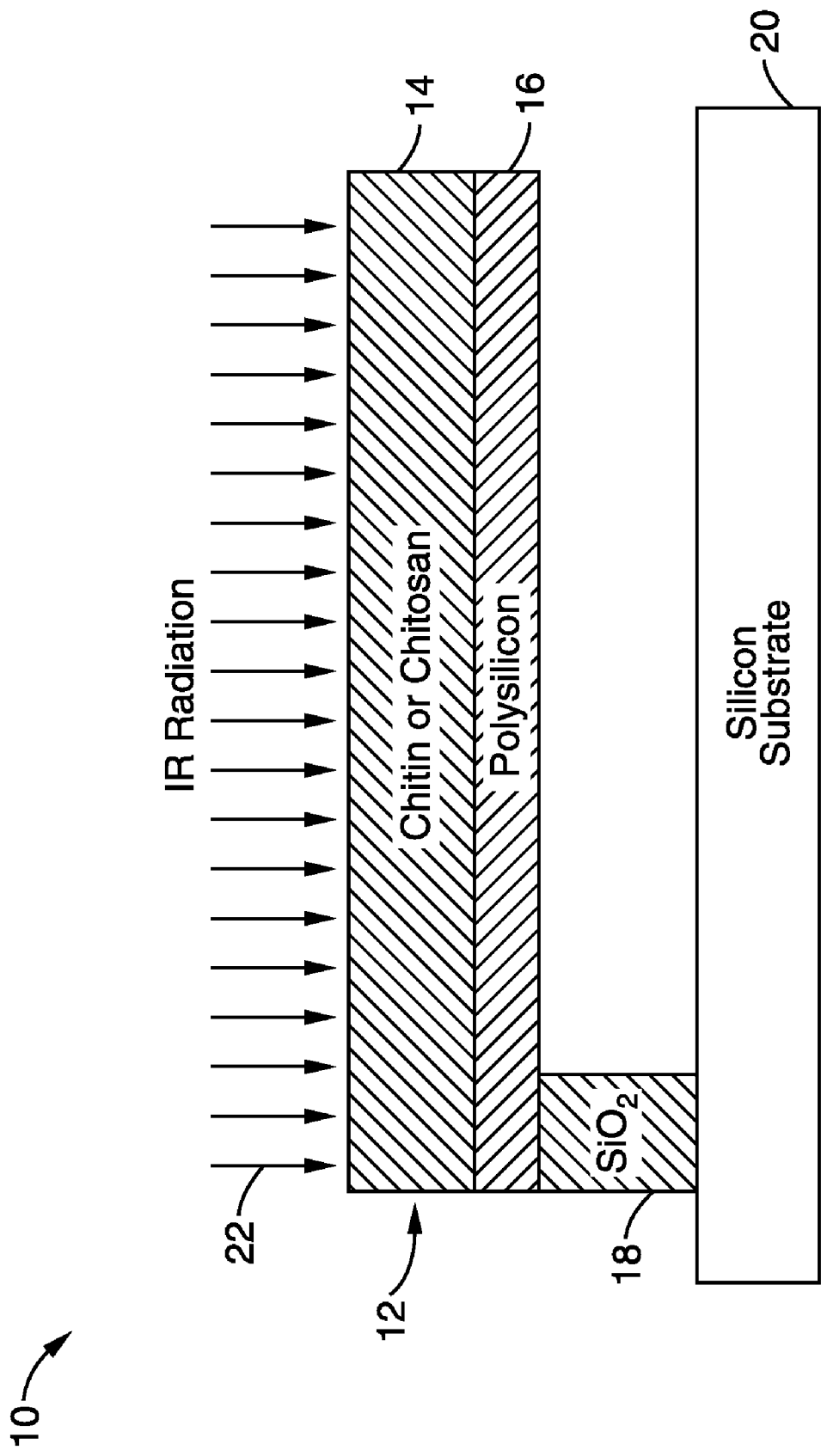
FIG. 1 is a schematic side view of one embodiment of the cantilever infrared detecting apparatus according to the invention.

Referring more specifically to the drawings, for illustrative purposes the present invention is embodied in the apparatus generally shown in FIG. 1 through FIG. 6B. It will be appreciated that the apparatus may vary as to configuration and as to details of the parts, and that the methods may vary as to the specific steps and sequence, without departing from the basic concepts as disclosed herein.

The present invention generally relates to sensors for sensing a change or displacement of a functionalized cantilever beam induced by the presence of infrared radiation. Thermal sensors generally operate by absorbing infrared or electromagnetic radiation and converting the radiation to heat energy. The heat energy produces a temperature change that is ultimately transduced into an electrical signal. However, the present invention utilizes the absorption of photons by the functional layer rather than heat alone to cause the bending moment of the cantilever beam. Since the photomechanical response of the polymers to incident infrared radiation is much greater than the response of the polymers to ambient temperature changes, the sensors do not require cooling resulting in a large reduction of bulk in comparison to current IR sensors for mid to far-IR ranges.

Polymers in general have high absorption in the infrared due to vibrational resonance modes of their organic bonds found in the terahertz range. The infrared sensitivity is characteristic of the organic bonds and therefore a polymer-based IR sensor can be tuned to detect specific wavelengths by carefully selecting materials with appropriate organic bonds. This differs from conventional thermal detectors that have a broadband response. Absorption of infrared radiation by the polymer causes conformational changes leading to compressing, stretching, bending or twisting of the base units resulting in a photomechanical response of the polymer. The increase of heat due to the absorption of the IR can also produce secondary thermal expansion of the polymer to a piezoelectric response from the polymer due to mechanical stretching. In general, these primary and secondary responses can be defined as a photomechanical response. Through careful synthesis of the polymers, the photomechanical response can be tailored to certain IR bands for detection purposes.

Chitosan and chitin and their derivatives are preferably utilized in the devices of the present invention as the active material to transduce infrared radiation into a mechanical or electric response. Conventional microfabrication materials such as the polymers PMMA (polymethyl methacrylate) or photoresist may also be used with the infrared absorbing layer and will have optical absorption properties specific to the bonding inherent to the polymer.

Chitin is an abundant polysaccharide in nature that is biodegradable, exhibits good biocompatibility, and is generally chemically resistant. Thus, chitin is stable over the long term, but its chemical resistance makes it difficult to process. Chitosan (deacetylated chitin), on the other hand, is relatively easy to process. Fabrication of the chitosan cantilever bimorph can utilize standard lithographic processes. For example, low, medium, and high molecular weight chitosan may be dissolved in varying concentrations of acetic acid, with deionized water used to control the pH of the solution. 0.22 μm filters can be used to purify low molecular weight chitosan solutions, while 1-40 μm filters are used to purify medium and high molecular weight chitosan solutions. The final solution is in hydrogel form, having medium to high viscosity. The deposition of chitosan as a functional layer can be done by spin-casting or by electrodeposition.

Cantilevers are relatively simple structures with a fixed beam that can be scaled and optimized for length, width and layer thickness. The formation of cantilever beams of micron and sub-micron dimensions and layers of materials can be accomplished with conventional photolithography techniques. An IR reflector layer may also be placed on top of or beneath the infrared absorbing layer. In the former case, the device may be back-illuminated through the IR transparent structural layer (such as polysilicon); while in the latter case the device may be front-illuminated.

A bimorph composed of two materials with different expansion coefficients produces a bending moment that leads to an out-of-plane deflection that can be detected by a variety of methods is provided. For cantilever based sensors, detection of cantilever motion and readout methods typically include optical, piezoresistive, capacitive and piezoelectric detection. The present invention can be adapted to use any of these detection methods as shown below.

The basic structure of one chitin cantilever bimorph embodiment 10 of the invention is shown in FIG. 1. The cantilever structure 10 has a beam 12 formed from an infrared absorbing layer 14 of chitin or chitosan that is coupled to a low expansion material layer 16 (such as polysilicon or silicon dioxide) that serves as a structural and support layer. The bimorph beam 12 is formed of the absorbing layer (chitin) 14 and a structural layer (polysilicon) 16 with a sacrificial oxide layer 18 for the release of the beam 12 which also serves as the anchor of the beam to the silicon base substrate 20 due to isotropic etching.

Incident IR radiation 22 is absorbed by the chitin layer 14 which produces a bending moment that causes the beam to deflect due to the expansion mismatch between the chitin layer 14 and polysilicon layer 16 of the beam. A change in dimensions of layer 14 from IR absorption drives the out-of-plane deflection in the vertical direction due to the large CTE mismatch and high absorption of infrared by the absorbing layer 14. The deflection is detected and preferably converted into an electrical readout signal.

Figure 2:
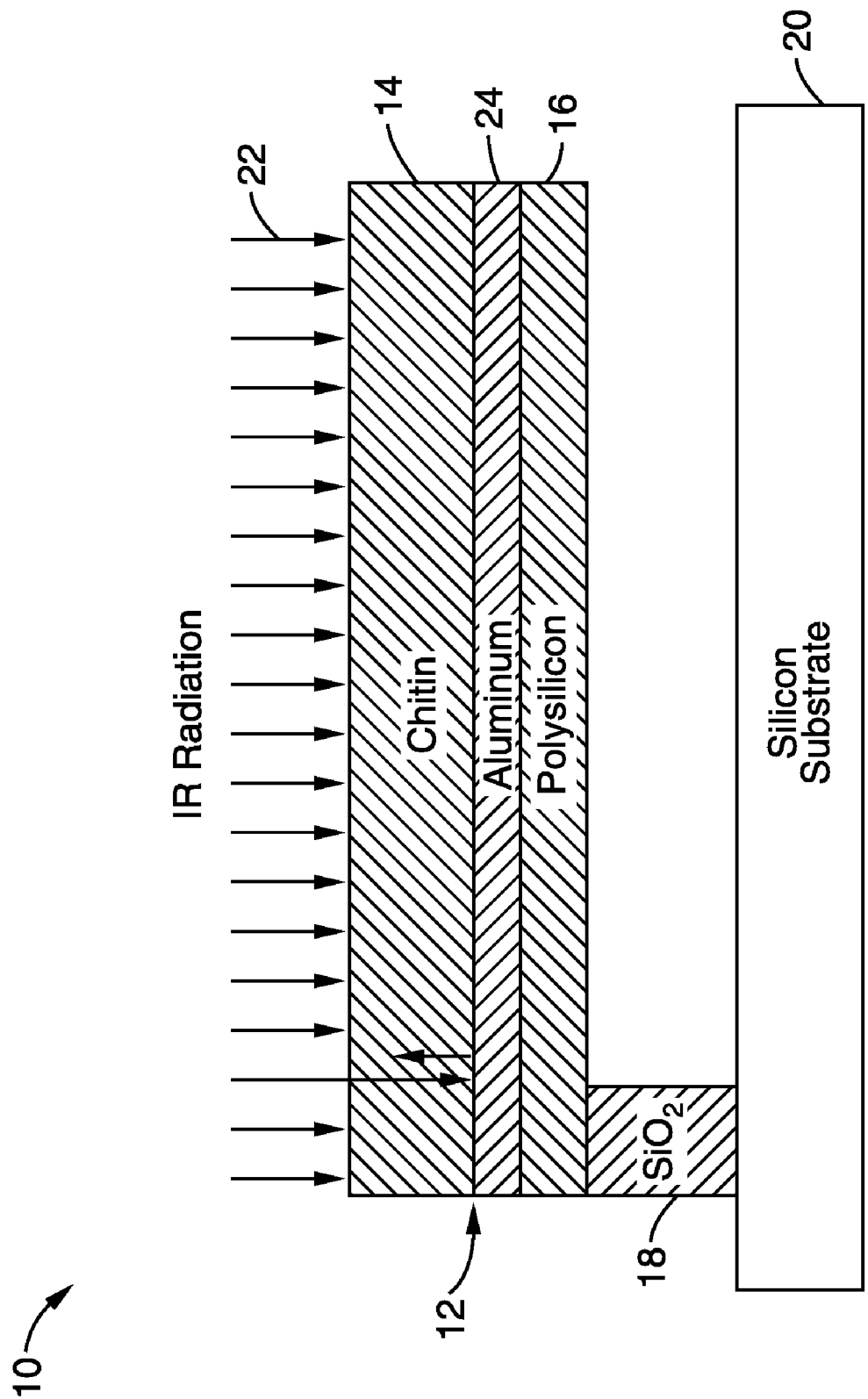
FIG. 2 is a schematic side view of a front-illuminated cantilever embodiment of the invention with a reflective metallic infrared reflector disposed below the active absorption layer according to the invention.
Figure 3:
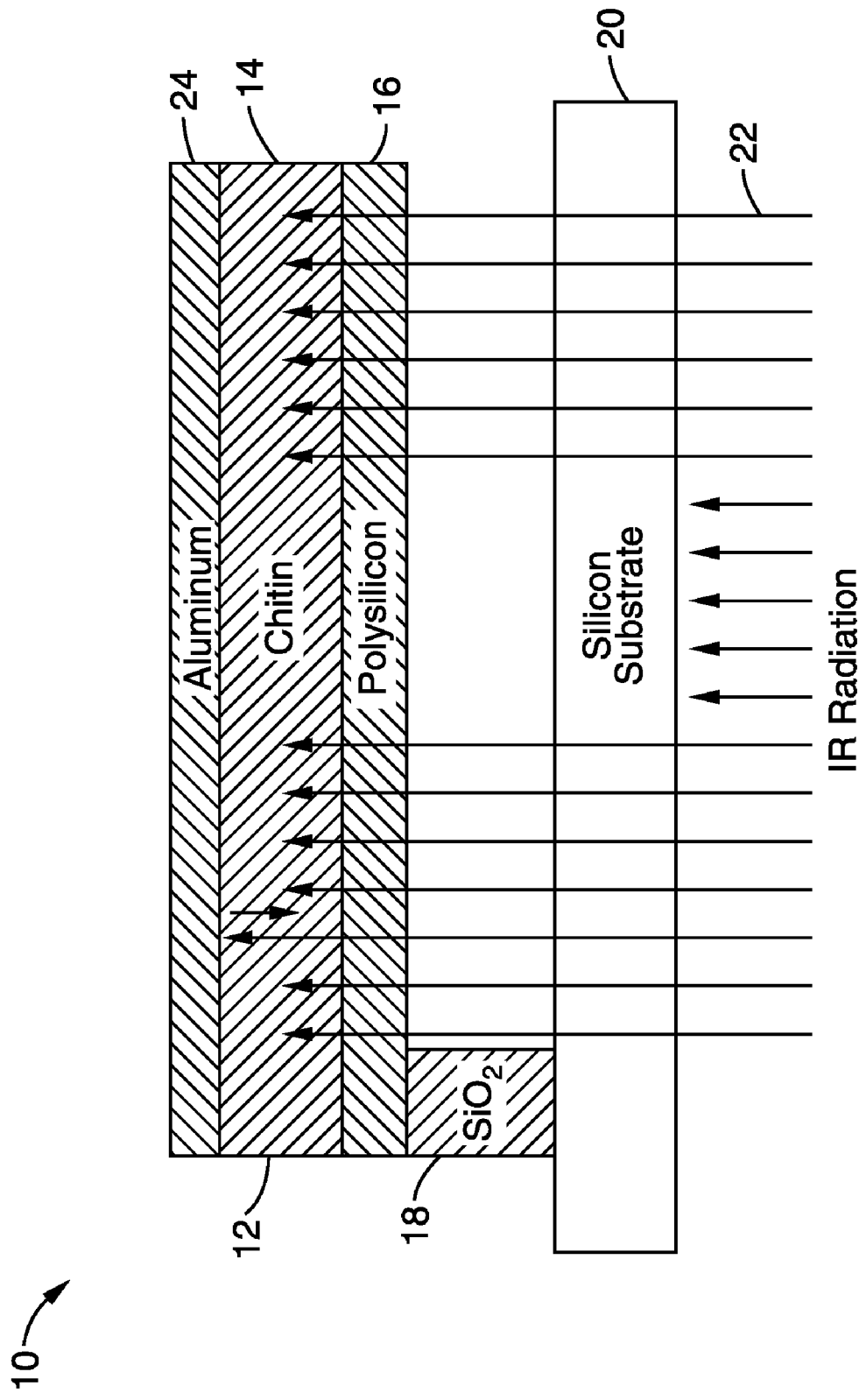
FIG. 3 is a schematic side view of a back-illuminated cantilever embodiment of the invention with a reflective metallic infrared reflector disposed on the outer surface of the active absorption layer with the radiation entering through the substrate.

Turning now to FIG. 2 and FIG. 3, the sensitivity of the device may be increased with the addition of an infrared reflecting layer to the structure of the beam. For example, Au, aluminum, or another metal may be used as an infrared reflector to potentially increase device sensitivity. The embodiment shown schematically in FIG. 2, illustrates a front-illuminated cantilever beam 12 with a functional infrared absorption layer 14 such as chitin or chitosan joined to a reflective layer 24 such as gold or aluminum that reflects incident infrared radiation 22 back through the functional layer 14 to increase the absorption of that layer and the strength of the deflection of the cantilever. The reflective layer 24 is supported by a polysilicon layer 16 forming the beam 12. The beam 12 is anchored by a silicon dioxide anchor in this embodiment to a silicon substrate base 20. Radiation 22 that was not absorbed through the first pass through the absorbing layer 14 is reflected by layer 24 and potentially absorbed during the second pass back through the functional absorbing layer 14. The reflective layer is preferably thin enough so as not to interfere or contribute mechanically to the movement of the cantilever beam yet reflect the infrared radiation back to through the absorbing layer 14.

A back-illuminated version of the cantilever 10 is illustrated in FIG. 3. The beam 12 of the cantilever 10 is exposed to infrared radiation through the silicon substrate base 20 and beam support layer 16 that are transparent to infrared radiation. The infrared absorbing layer 14, preferably made from chitin or chitosan, has a reflective layer 24 that reflects radiation 22 back to the absorbing layer 14 thereby increasing the absorption of the functional layer 14.

Figure 4:
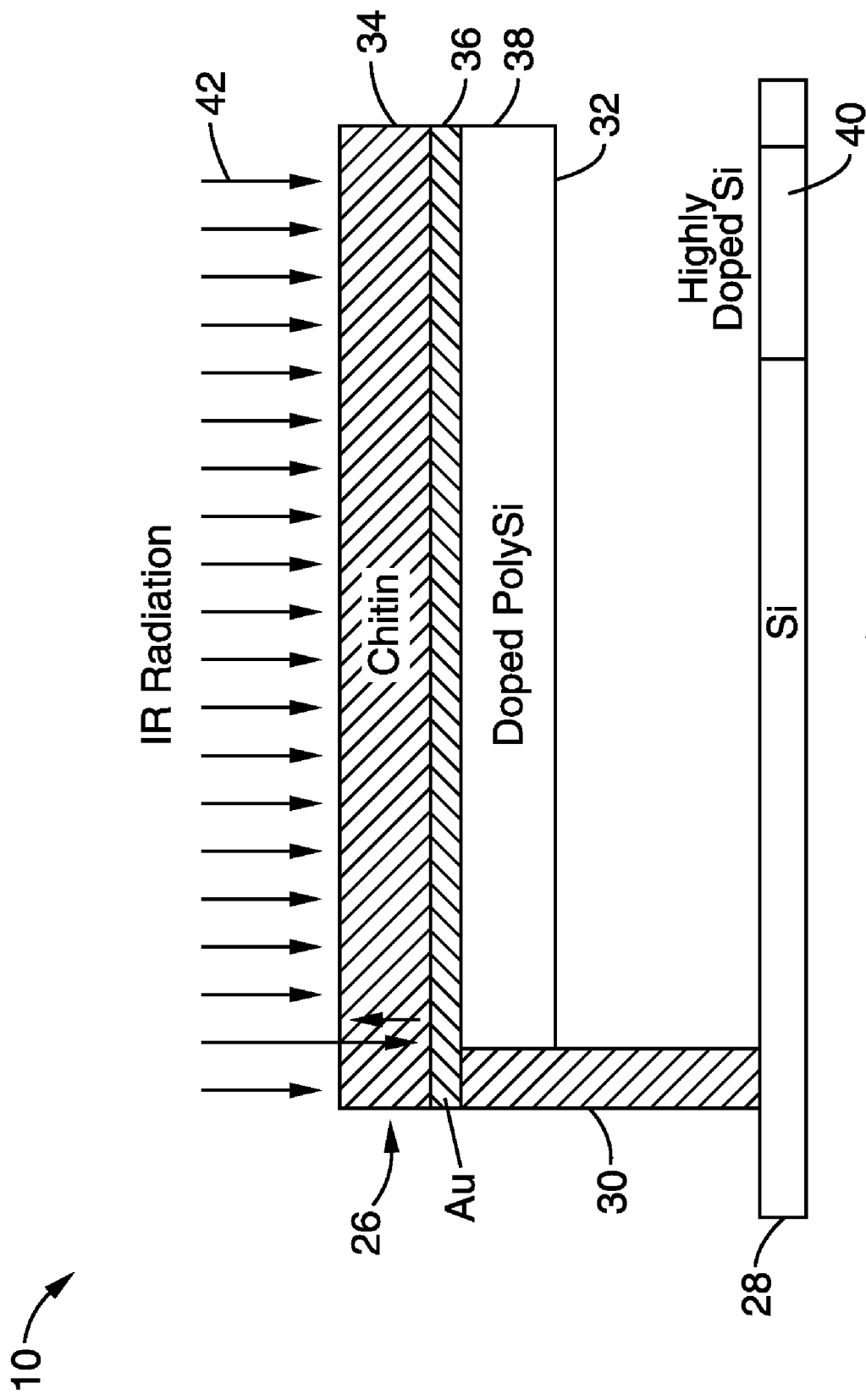
FIG. 4 is a schematic side view representation of a capacitive cantilever readout embodiment with doped silicon or polysilicon and a reflective layer.

Referring now to FIG. 4, an alternative embodiment of the invention is schematically shown that uses a capacitive readout to determine cantilever deflection. The cantilever 10 has beam 26 anchored to a silicon base 28 with an anchor 30 permitting the end 32 of the beam 26 to move freely or for the beam to resonate. The beam 26 shown in FIG. 4 has a functional layer 34, an infrared reflective layer 36 and a doped polysilicon structural layer 38. The base 28 has a highly doped section 40 opposite and across the gap from the tip 32 of beam 26.

This embodiment makes use of a capacitor that is formed between a conducting layer 38 in the cantilever beam 26 and a doped region 38 of the substrate base 28. As the cantilever beam 26 deflects, the gap between the cantilever beam 26 and substrate 28 changes, thus altering the capacitance between the cantilever's conducting region 32 and the doped area 40 beneath the edge of the cantilever tip 32.

The advantage of this approach is the use of a single cantilever for both sensing and forming the capacitive signal that can then be read out, all in a single device that occupies a minimum of wafer space. In one embodiment, the cantilever capacitors are connected in parallel, so as to increase their capacitance.

During fabrication, regions of the substrate 28 underlying the edges of the soon to be fabricated cantilevers are selectively doped which makes them conducting. A sacrificial layer, such as SiO$_2$, is deposited, followed by a structural layer such as polysilicon. An absorbing layer is deposited, and the absorbing and structural layers are then patterned. Lastly, the sacrificial layer is released, forming the free cantilever structure. The capacitor is formed from the doped region underlying the cantilever end, and a conducting layer of the cantilever itself, such as a doped polysilicon layer, gold layer, or aluminum layer.

Figure 5:
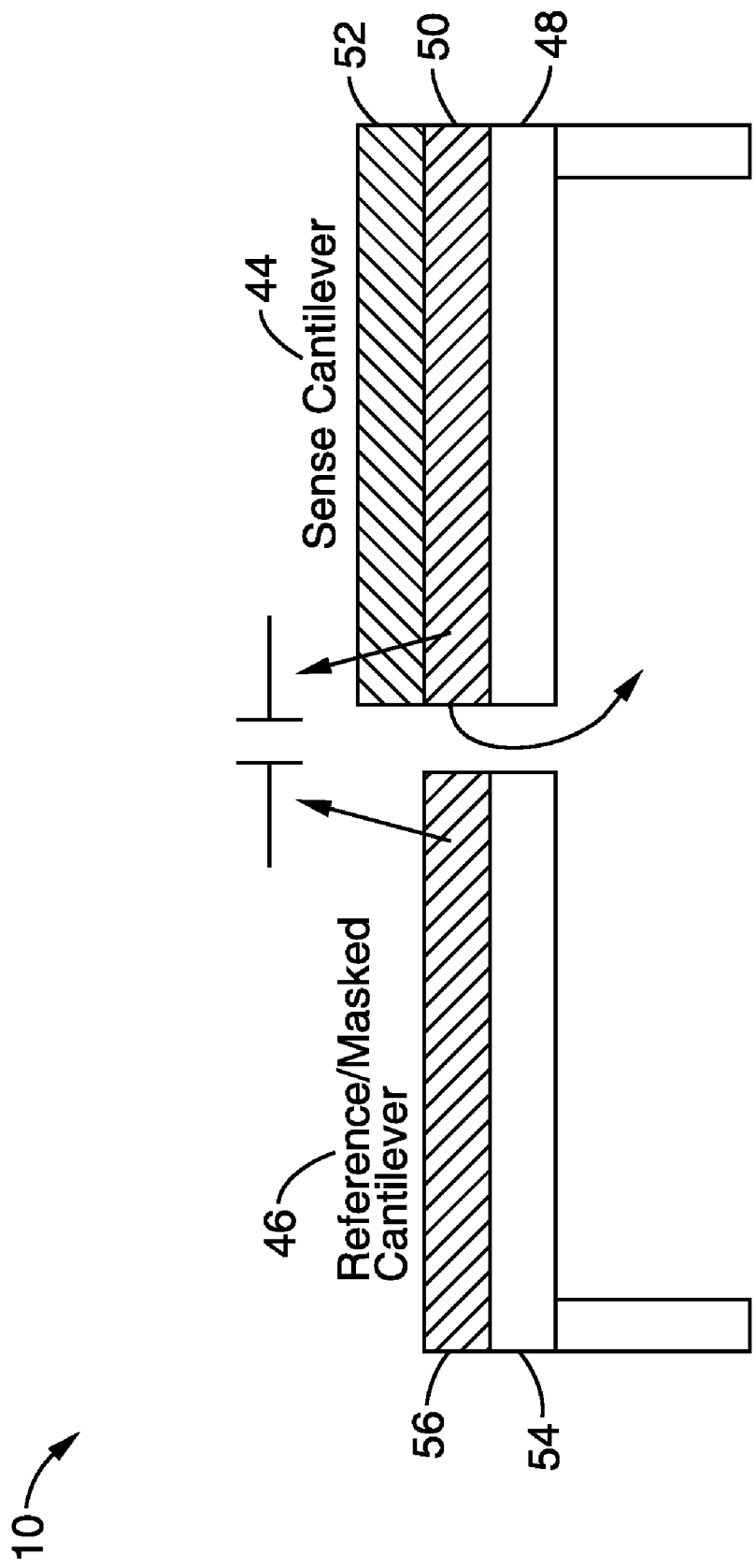
FIG. 5 is a schematic side view representation of a capacitive cantilever embodiment with at least one sense cantilever and a reference cantilever.

An alternative embodiment using a lateral double cantilever configuration to produce a capacitive readout is illustrated in FIG. 5. Cantilevers are paired and aligned tip to tip within the same horizontal and vertical planes. The first cantilever 44 has a beam with a conductive layer 48, a structural layer 50 and a functional layer 52. The second cantilever 46 is a reference cantilever and has a conductive layer 54 and a structural layer 56 that are matched in three-dimensional space with a defined gap between the beams 44, 46. The two cantilevers with ends facing each other, each containing a conducting layer 54, will move in response to some triggering event. The power of this approach is that the internal capacitance of the cantilevers is removed from the actual capacitive measurement. In the embodiment shown, one of the cantilevers is a sense cantilever 44, while the other cantilever 46 is masked so as to not have the sense effect. For example, relative binding to patterned analytes can be detected in this way. This effectively creates an adjustable capacitance that depends on the position of the two cantilevers. Furthermore, such an arrangement holds a degree of built-in noise suppression, as both the sense and the masked cantilever should receive approximately the same amounts of noise.

A second embodiment uses both cantilevers for sensing (no reference), and the deflection of both (which should be approximately equal), alters the gap between the conducting layers. The cantilevers may be structured like sense cantilever 44 in this embodiment.

The gap between the cantilevers 44, 46 can be defined photolithographically and will not limit the motion of the beam. The magnitude of the capacitance is dependent on the thickness and width of the conducting layers, the dielectric (in most MEMS, air), and the size of the gap between the two conducting electrodes. A signal generates a bending in the sense cantilever 44, changing the gap between the sense cantilever 44 and masked cantilever 46, and thus altering the observed capacitance of the structure.

Figure 6B:
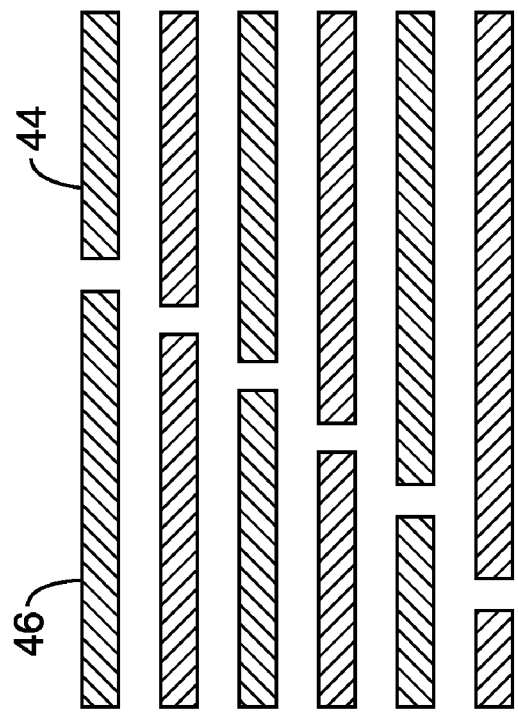
FIG. 6B is a top view of a stacked array of cantilever beams of unequal length that are aligned end to end according to the invention.
Figure 6A:
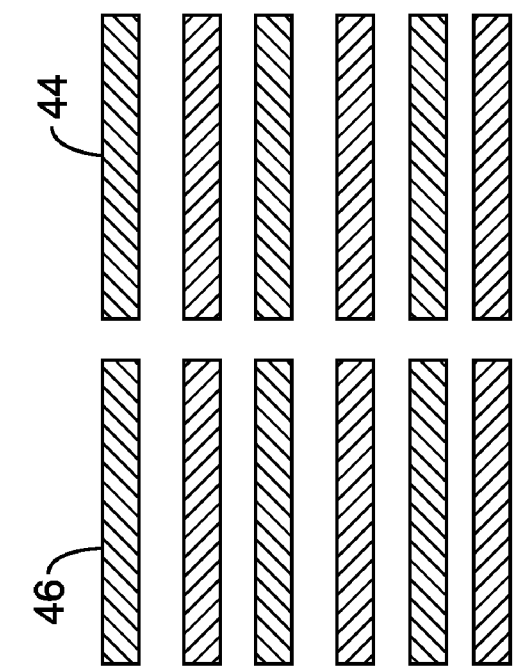
FIG. 6A is a top view of an array of cantilever beams of equal length and are aligned end to end according to the invention.

Referring also to FIG. 6A and FIG. 6B, the amount of deflection of the beam may also be adjusted by changing the length of the beam since a longer cantilever beam may have a greater deflection than a comparatively shorter beam. The capacitance of the system may be increased by connecting the cantilever capacitors in parallel. The advantage of this configuration is that it requires very little deflection in the cantilever to create a capacitive change, and the fabrication is simplified as well. An alternative approach employs a selectively doped region in the substrate to form an electrode beneath the cantilever and uses a vertical rather than a lateral gap to define the capacitor as shown in FIG. 4.

The lengths of the sense 44 and reference 46 cantilever beams can be the same as shown from the top in FIG. 6A or the lengths can be different as shown in FIG. 6B. The stacked array embodiment of FIG. 6B shows a plurality of cantilever readouts that are configured in an array where the sense and corresponding reference cantilevers have different lengths but occupy the same total length on a wafer.

In an alternative embodiment, a comb capacitor array of cantilever beams is formed with two groups of interdigitating beams. In this configuration, the capacitor is formed between two conducting layers on beams that are placed side by side rather than end to end. However, unlike traditional comb drive devices, where motion occurs in the plane of the substrate, this configuration uses vertical deflection of the beams to alter the comb overlap and hence the capacitance. The large surface area formed from the cantilevers (or tines), increases the capacitance.

As the cantilever beam deflects, the overlap between the sense cantilever beam and the two reference cantilever beams changes, and this overlap area is proportional to the capacitance. To further increase capacitance, these devices may be placed into arrays and connected in parallel. The advantage of this configuration is that the capacitance is increased as well as inherent noise cancellation, since unwanted signals should actuate the reference and sense cantilevers approximately equally.

The invention may be better understood with reference to the accompanying examples, which are intended for purposes of illustration only and should not be construed as in any sense limiting the scope of the present invention as defined in the claims appended hereto.

EXAMPLE 1

In order to optimize the cantilever design dimensions and to simulate the out of plane deflection of a cantilever beam, several analytical models were used. A simplified analytical model for predicting out-of-plane deflection in a cantilever bimorph due to a temperature change was selected. The first model considered the length of the bimorph, coefficient of thermal expansion mismatch, the Poisson ratio effect and the thickness and biaxial modulus of each layer. The model shown below is proposed by G. A. Gehring, M. D. Cooke, I. S. Gregory, W. J. Karl, and R. Watts. Cantilever unified theory and optimization for sensors and actuators. *Smart Materials and Structures* vol. 9, pp. 918-931, 2000.

$$y = \frac{3L^2(\alpha_{bi} - \alpha_{subs})(T - T_o)(t_a + t_b)K}{(t_a \cdot t_b)}$$

$$K = \left[\left(\frac{t_b}{t_a}\right)^2 \frac{Y_b(1-v_a)}{Y_a(1-v_b)} + 4\frac{t_b}{t_a} + 6 + 4\frac{t_a}{t_b} + \left(\frac{t_a}{t_b}\right)^2 \frac{Y_a(1-v_b)}{Y_b(1-v_a)}\right]^{-1}$$

The Gehring model is purely an analytical solution for predicting cantilever deflection based on materials and geometries, and does not relate to any specific application or engineered device. In addition, the Gehring model is superior for predicting the deflection of microfabricated bimorphs were the ratio of the thicknesses is generally <10:1.

Finite element results were vetted against analytical results obtained using the Gehring model. Predicted deflections agreed to within less than 5% error. For example, 3D finite element model for a cantilever bimorph formed of 700 nm thick polysilicon and 1 μm thick PMMA compared favorably. For a 5 mW/cm$^2$ incident power over the top (PMMA) surface, the beam deflects 3.56 μm out of plane for a sensitivity of 0.1424 nm/mK. A photoresist thickness of 1.82 μm was found to maximize the cantilever deflection for a 700 nm thick polysilicon layer.

Finite element results comparing the use of polysilicon as a substrate and silicon dioxide as a substrate were also obtained. Finite element and analytical models show silicon dioxide offers an enhancement in deflection (and therefore sensitivity) compared to polysilicon, though the use of silicon dioxide as the structural layer may require a modification of the fabrication process to use bulk etching and introduce some processing issues.

Accordingly, an array of cantilever elements allows for high-throughput or 2D imaging for a variety of applications. The resulting devices offers a novel, highly optimized uncooled thermal detector which may complement (or be combined with) existing lead salt detectors such as PbS or PbSe. The simplified fabrication processes and low-cost materials allow for the development of a novel infrared detector with significantly reduced cost. In addition, this device may compete against photon detectors such as HgCdTe in terms of cost, its ability to provide some spectral sensitivity, the lack of cryogenic cooling and associated mechanical components, and system weight.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. An infrared radiation sensor, comprising:
   a bimorph cantilever beam comprising a structural layer and a chitosan infrared radiation absorbing layer; and
   a beam deflection detector;
   wherein deflection of said cantilever beam from absorption of infrared radiation by said infrared absorbing layer is detected.

2. An infrared sensor as recited in claim 1, wherein said infrared absorbing layer comprises chitin or a chitin derivative.

3. An infrared sensor as recited in claim 1, wherein said beam deflection detector is a detector selected from the group of detectors consisting essentially of an optical detector, a piezoresistive detector, a capacitive detector and piezoelectric detector.

4. An infrared sensor as recited in claim 1, further comprising:
   an infrared reflecting layer coupled to said infrared absorbing layer,
   wherein infrared radiation that is not absorbed and passes through said infrared radiation absorbing layer is reflected back to said absorbing layer.

5. An infrared sensor as recited in claim 1, further comprising a plurality of cantilevers forming an array.

6. An infrared sensor as recited in claim 1, further comprising:
   a conducting substrate disposed below said cantilever beam, said structural layer comprising a conductor forming a capacitor;
   wherein said capacitance changes with vertical deflection of the cantilever beam.

7. An infrared sensor as recited in claim 6, further comprising:
   an infrared reflecting layer coupled to said infrared absorbing layer;
   wherein infrared radiation that is not absorbed and passes through said infrared radiation absorbing layer is reflected back to said absorbing layer.

8. An infrared sensor as recited in claim 7, wherein said reflecting layer comprises aluminum metal or gold metal.

9. An infrared radiation sensor, comprising:
   a sense cantilever beam comprising a conducting layer, a structural layer and a chitosan infrared radiation absorbing layer and a free end;
   a reference cantilever beam comprising a conducting layer and a structural layer with a free end oriented on the same vertical and horizontal planes as the sense cantilever beam; and
   a beam deflection detector;
   wherein a change in capacitance upon deflection of said sense cantilever beam from absorption of infrared radiation is detected.

10. An infrared sensor as recited in claim 9, wherein said sense cantilever beam infrared absorbing layer comprises chitin or a chitin derivative.

11. An infrared sensor as recited in claim 9, further comprising:
    an infrared reflecting layer coupled to said infrared absorbing layer of said sense cantilever beam;
    wherein infrared radiation that is not absorbed and passes through said infrared radiation absorbing layer is reflected back to said absorbing layer.

12. An infrared sensor as recited in claim 11, wherein said reflecting layer comprises aluminum metal or gold metal.

13. An infrared sensor as recited in claim 9, further comprising a plurality of sense cantilevers and reference cantilevers operably connected in parallel.

14. An infrared sensor as recited in claim 9, wherein said reference cantilever beam further comprises an infrared radiation absorbing layer.

15. An infrared sensor as recited in claim 9, wherein said sense cantilever beams and said reference cantilever beams have the same length.

16. An infrared sensor as recited in claim 9, wherein said sense cantilever beams and said reference cantilever beams have different lengths.

17. An infrared radiation sensor, comprising:
- a first plurality of electrically interconnected sense cantilever beams each comprising a conducting layer, a structural layer and a chitosan infrared radiation absorbing layer, each beam in parallel orientation with each other;
- a second plurality of electrically interconnected reference cantilever beams each comprising a conducting layer and a structural layer, each beam in parallel orientation with each other and with said first plurality of beams and positioned interdigitally with said first plurality of beams; and
- a comb capacitor readout for said sense cantilever beams where a capacitor is formed by two reference cantilevers on the sides of a sense cantilever;
- wherein said sense cantilevers deflecting in the vertical direction change the amount of overlap with the reference cantilevers upon absorption of infrared radiation by said absorbing layer.

18. An infrared sensor as recited in claim 17, wherein said sense cantilever beam infrared absorbing layer comprises chitin or a chitin derivative.

19. An infrared sensor as recited in claim 17, further comprising:
- an infrared reflecting layer coupled to said infrared absorbing layer of said sense cantilever beam;
- wherein infrared radiation that is not absorbed and passes through said infrared radiation absorbing layer is reflected back to said absorbing layer.

20. An infrared sensor as recited in claim 17, wherein said reflecting layer comprises aluminum metal or gold metal.

* * * * *